United States Patent [19]

Bourgois

[11] Patent Number: 5,234,044
[45] Date of Patent: * Aug. 10, 1993

[54] VEHICLE TIRE INCLUDING A PLURALITY OF TIRE BELT REINFORCING STRIPS

[75] Inventor: Luc Bourgois, Desselgem, Belgium

[73] Assignee: N.V. Bekaert S.A., Zwevegem, Belgium

[ * ] Notice: The portion of the term of this patent subsequent to Jun. 20, 2006 has been disclaimed.

[21] Appl. No.: 703,044

[22] Filed: May 17, 1991

Related U.S. Application Data

[60] Continuation of Ser. No. 337,408, Apr. 13, 1989, abandoned, which is a division of Ser. No. 95,022, Sep. 10, 1987, Pat. No. 4,840,214.

[30] Foreign Application Priority Data

Oct. 10, 1986 [EP] European Pat. Off. ........ 86870146.7
Mar. 9, 1987 [EP] European Pat. Off. ........ 87200427.0

[51] Int. Cl.$^5$ ............................ B60C 9/00; B60C 9/18
[52] U.S. Cl. .................................... 152/527; 152/451; 428/295; 428/379
[58] Field of Search ............... 152/451, 526, 527, 540, 152/533; 57/902, 212, 232, 200, 223, 224; 245/1.5; 428/295, 256, 295, 379; 156/136, 181, 178-179, 437, 433, 166; 139/425 R

[56] References Cited

U.S. PATENT DOCUMENTS

| | | | |
|---|---|---|---|
| 1,914,040 | 6/1933 | Pierce | 156/136 X |
| 1,992,665 | 2/1935 | Hazell | 156/166 X |
| 3,298,417 | 1/1967 | Keefe, Jr. | 152/527 X |
| 3,583,463 | 6/1971 | O'Neil | 152/535 |
| 3,794,097 | 2/1974 | Kind . | |
| 3,957,091 | 5/1976 | Buyssens et al. | 139/425 R |
| 4,064,915 | 12/1977 | Buyssens et al. | 156/178 X |
| 4,216,856 | 8/1980 | Moring et al. | 156/181 X |
| 4,486,477 | 12/1984 | Mirza | 152/451 X |
| 4,606,392 | 8/1986 | Weidenhaupt et al. | 152/527 X |
| 4,650,531 | 3/1987 | Brandyberry et al. | 156/166 |

FOREIGN PATENT DOCUMENTS

| | | | |
|---|---|---|---|
| 0043563 | 1/1982 | European Pat. Off. . | |
| 1245166 | 9/1960 | France | 152/533 |
| 1487426 | 9/1977 | United Kingdom | 152/533 |

Primary Examiner—Michael W. Ball
Assistant Examiner—Adrienne C. Johnstone
Attorney, Agent, or Firm—Foley & Lardner

[57] ABSTRACT

A reinforcing strip, and method of making same specifically adapted for use in reinforcing plies in the belt of rubber tires. The strip comprises a number, preferably 4 to 7, of parallel wires, tightly bound together by a wrapping wire or a binder. This strip form allows to combine the advantages of steel strip, i.e. high lateral and low radial stiffness and thinner plies, with those of conventional steel cord, i.e. high tensile strength and fatigue resistance.

2 Claims, 3 Drawing Sheets

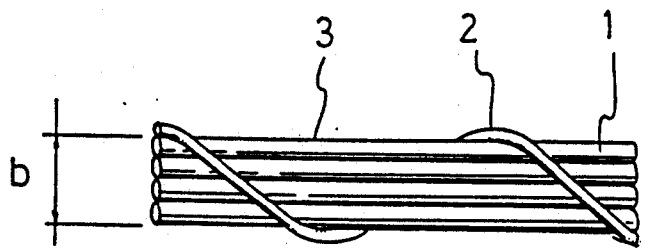
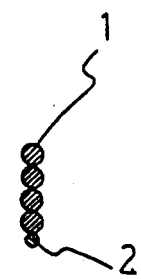
FIG.1  FIG.2
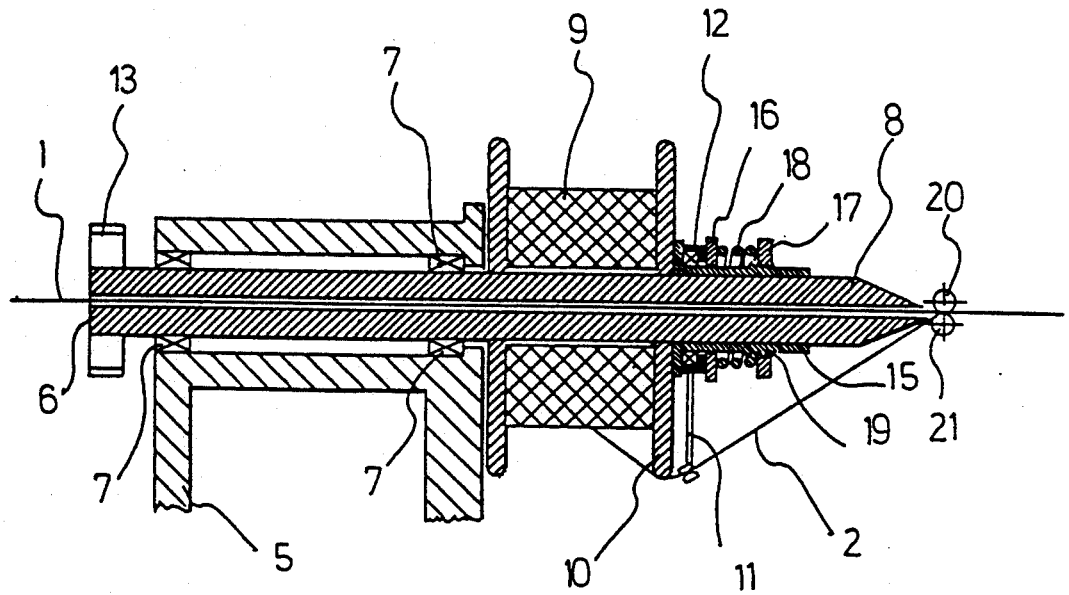
FIG.3
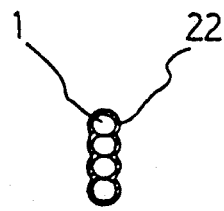
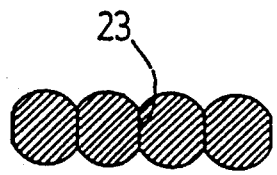
FIG.4  FIG.5

VEHICLE TIRE INCLUDING A PLURALITY OF TIRE BELT REINFORCING STRIPS

This application is a continuation of application Ser. No. 07/337,408, filed Apr. 13, 1989, now abandoned, which is in turn a divisional application of Ser. No. 07/095,022, filed Sept. 10, 1987 now U.S. Pat. No. 4,840,214.

BACKGROUND OF THE INVENTION

The invention relates to a reinforcing strip comprising steel and adapted for the reinforcement of the belt of rubber vehicle tires and having a significantly higher bending stiffness in the plane of the strip than in the longitudinal plane (i.e. a plane comprising the longitudinal axis of the strip), perpendicular to the plane of the strip. The strip according to the invention must be preferably used for the reinforcement of vehicle tires the reinforcement plies of which have at the meridian plane a radius of curvature of at least 1500 mm. Such strip can be in the form of a continuous long strip that is, or can be wound on a spool, or in the form of one or more separate ends of a length which preferably ranges in the order of magnitude of about 30 cm, e.g. in the range from 15 cm to 50 cm.

The mention that the strips are of the type that are adapted for the reinforcement of the belt of rubber vehicle tires does not limit its possible use in other applications such as the reinforcement of elastomeric articles in general. The mention means only that the strips have the necessary characteristics for such use, which are: a steel cross-section of the order of magnitude ranging between 0.05 mm$^2$ and 2 mm$^2$, preferably in the range between 0.150 mm$^2$ and 1 mm$^2$, a tensile strength of the reinforcing steel of more than 2200 N/mm$^2$, preferably more than 2500 N/mm$^2$, an elongation at break of more than 1.5%, the reinforcing steel being covered with a rubber adherable coating, such as e.g. a metallic coating of brass.

It is already known, e.g. from U.S. Pat. No. 3,794,097, to form the belt ply of rubber vehicle tires, by laying short ends of nearly rectangular steel strips, instead of conventional steel cord, in a parallel disposition side by side with interstices between adjacent strips, filled with rubber.

A first advantage with respect to the use of conventional steel cords is, that the same amount of reinforcing steel can be laid in a thinner layer so as to obtain thinner and lighter plies. A second and important advantage is, that the strips have a much higher bending stiffness in the plane of the belt, and this reduces the deformation and heat generation under alternating shearing stresses in that plane, whilst maintaining good flexibility in any plane perpendicular to the belt.

The existing steel strips present however the important drawback, with respect to the use of conventional steel cord, of poor mechanical properties, especially tensile strength and fatigue endurance, due to the method in which they have to be made. Known methods are: slitting steel sheet or flat rolling of round wire. Slitting steel sheet produces sharp edges where stresses and fatigue crack initiation are concentrated. Flat cold rolling of round wire does not yield a high tensile strength level, because the rolling must be stopped far before such high level is reached in order to keep sufficient ductility for the subsequent rolling operation, in which the tensile strength level drops again. Due to the fact that in general the obtained fatigue resistance will be about 33% of the obtainable tensile strength, and that the strip in general shows some delamination bursts due to rolling, it will be difficult to reach a fatigue resistance of 600 Newton/mm$^2$, whereas the new obtainable fatigue resistance of conventional high-tensile steel cord lies about twice this amount.

Attempts have been made to improve the mechanical properties of the steel strips by the use of an appropriate heat treatment, such as disclosed in U.S. Pat. Nos. 4,017,338 and 4,142,920. This results however into additional manufacturing costs and the mechanical properties as disclosed are still far from those of conventional steel cord. Among other things, the delamination bursts can indeed not be repaired by any heat treatment.

SUMMARY OF THE INVENTION

It is an object of the present invention to provide a reinforcing strip avoiding these drawbacks whilst still maintaining as much as possible the above-mentioned advantages of steel strip.

In accordance with the present invention there is provided a tire belt reinforcing strip, a vehicle tire including a belt portion reinforced with a plurality of the tire belt reinforcing strips, and method of making the strip. The tire belt reinforcing strip of the invention has a significantly higher bending stiffness in the plane of the strip than in the longitudinal plane perpendicular thereto. The strip is in the form of a bundle of steel wires extending side by side in one plane when the bundle is in a free straight position. Adjacent wires contact with each other and are bound to each other to such an extent that the strip presents, in the plane of the strip, a significant excess of bending stiffness above the sum of the bending stiffness of the individual wires in the same plane; the steel cross section being between 0.05 mm$^2$ and 2 mm$^2$ with a tensile strength above 2200 N/mm$^2$ and an elongation at break above 1.5%.

The method in accordance with the invention is designed to provide a significantly higher bending stiffness to a tire belt reinforcing strip in a plane of the strip than in a longitudinal plane perpendicular thereto. The method comprises arranging a plurality of strands of wire-like material together in longitudinal, side by side, parallel relation so as to form a strip. A wire-like wrapping material is provided and is wrapped around the strip in intimate contact therewith under pressure to tightly wrap the strip so that the position of the strands comprising the strip is not substantially changed outside the plane of the strip.

In order to maintain these advantages as much as possible, the reinforcement will still be in the form of a strip having a significantly higher bending stiffness (i.e., at least twice) in the plane of the strip than in the axial plane perpendicular thereto. But the invention is characterized by the fact that the strip is in the form of a bundle of steel wires, extending side by side, in one plane when the bundle is in free straight position, adjacent wires being in contact with each other along the length and bound to each other to such extent that the strip presents, in the plane of the strip, a significant excess of bending stiffness above the sum of the bending stiffness of the individual wires in the same plane. By "significant excess" is meant that the excess be at least one, preferably more than four times the bending stiffness of the individual wires in the plane of the strip.

For parallel wires which are loosely bound adjacent to each other (such as is the case in the European patent application with publication No. 00 43 563), it is known that the bending stiffness in the plane of the strip is equal to the sum of the bending stiffness of the individual wires in that plane, and that there is no significant excess above said sum. In the invention however, the wires are disposed side by side in a line contact with each other and so tied or bound together, that a significant excess is obtained, so that advantage can be taken of the strip-form.

The invention consists in fact in subdividing the breadth of the rectangular steel strip of the prior art, which is difficult to make with good properties, into a number of separate sections, each represented by a wire having a cross-sectional shape which is adapted for manufacturing by wire drawing, in which the whole technology of prior art wire drawing is available for obtaining more optimal mechanical properties, such as a tensile strength above 2750 N/mm$^2$ and a fatigue resistance above 900 N/mm$^2$, preferably above 3000 N/mm$^2$ and 1000 N/mm$^2$ respectively. The number of wires is preferably 4 to 7. Round wires are preferred because the drawing and positioning of round wires puts the least problems, although other shapes are not excluded, in so far as their cross-section is adapted for wire drawing. The diameter of each wire is preferably in the range of 0.15–0.40 mm. Round wires have the further advantage with respect to steel strips that, for a same volume of steel, there is a greater steel surface available for the adherence of steel to the rubber matrix or elastomeric composition that it has to reinforce.

In order to apply the invention, it is however not sufficient to merely subdivide the breadth of a steel strip into a number of separate sections, each represented by a wire. If these wires, disposed in parallel in one plane, are loosely bound to each other so as to allow free movement between them, the whole would not act as a strip in the sense as to produce a higher bending stiffness in the plane of the strip. The stiffness would be the sum of the stiffnesses of the individual wires, whether they are disposed in a flat or in a round bundle. It is necessary that the adjacent wires are bound to each other, in a more or less yieldable way, but still so that the wires can interact so as to present in the plane of the strip, a significantly higher bending stiffness than the sum of the bending stiffnesses, in the same plane, of the individual wires.

The wires can be bound together e.g. by a wrapping wire, tightly wound around the flat bundle with a short pitch of preferably 1 to 4 times the breadth of the strip, so as to provide sufficient friction resistance between adjacent wires in order to raise the bending stiffness in the plane of the strip. This friction resistance can be improved, if desired, by providing a larger contact surface between adjacent wires instead of the line contact of perfectly round wires. The wrapping wire will preferably be a metallic wire of high tensile strength (e.g. above 2000 N/mm$^2$ in order to have a minimum diameter for this wire, e.g. not more than 70% of the thickness of the parallel wires, so that the thickness dimension of the strip can be kept as low as possible) but this wrapping wire, due to the short pitch with which it is wound around the strip, does not participate to the tensile strength of the strip.

The parallel wires can also be bound together by other mechanical binding means. But it is also possible to bind them together by a chemical adhesive, in so far as this adhesive does not harm the bond of the strip to rubber and in so far the shearing modulus of the chemical adhesive is greater than 2.5 MN/m$^2$ (Meganewton per square meter). The latter property is necessary in order to provide a real bond between the adjacent wires. For comparison: the shearing modulus of rubber that is conventionally used in the belt of vehicle tires, is less than 1.7 MN/m$^2$; such rubber should only provide a loose bond between the adjacent wires. However, rubbers having a shearing modulus greater than 2.5 MN/m$^2$ may also provide a real bond between the adjacent wires when the strip is used to reinforce the belt portion of a vehicle tire, therefore, the adhesive has a shearing modulus greater than the shearing modulus of the belt rubber. The mechanical and chemical binding means can be combined and the whole presents itself either as a strip of infinite length which can be, or is wound on a spool, or as a number of separate strips with definite length.

The wires used for the reinforcing strip are preferably wires of the same kind as used for conventional steel cord, i.e. of the same steel composition, metallographic structure and physical characteristics due to the processing. This means a drawn pearlitic structure of a tensile strength of at least 2750 N/mm$^2$, preferably at least $2325-1130 \log d$ Newton/mm$^2$ (d being the diameter of the wire in mm) and an elongation at break of more than 1.5%, and a composition in which the carbon, manganese and silicon are present in the ranges going respectively from 0.6 to 1% (preferably 0.7 to 0.9%), from 0.2 to 0.8%, and from 0.1 to 0.4%. The drawn structure can be recognized by the uniform hardness over the cross-sectional surface (i.e. a fluctuation of the Vickers hardness of maximum 10%). In order to reach a fatigue resistance value (as measured by the Hunter fatigue test) of at least 33% of the value of the tensile strength, the drawn wires can be processed by alternating bendings in the same way as disclosed in the French laid open application No. 82-01565. Other types of wire, processed to suitable properties can be used, such as drawn wire which is heat treated afterwards into tempered martensite as disclosed in U.S. Pat. No. 4,106,957.

BRIEF DESCRIPTION OF THE DRAWINGS

The invention will now further be explained with reference to the accompanying drawings in which FIG. 1 shows a front view of a strip according to the invention FIG. 2 shows a cross-sectional view of the same strip FIG. 3 shows a wrapping machine, adapted for making such strip FIG. 4 shows a cross-sectional view of another type of strip according to the invention FIG. 5 shows a cross-sectional view of a type of strip with non-round wires.

DETAILED DESCRIPTION OF THE PREFERRED EMBODIMENTS

Figure 6:
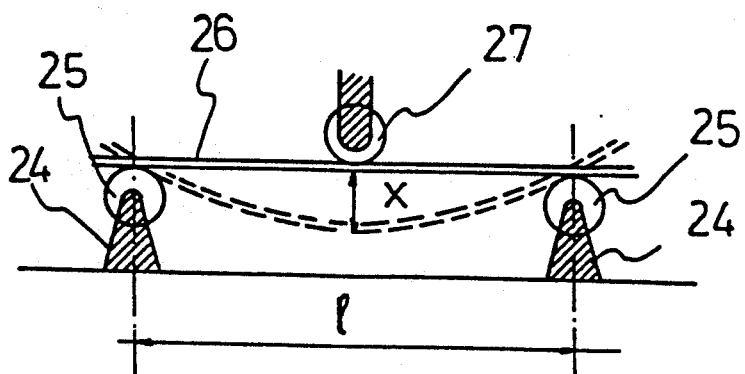
FIG. 6 shows a set-up of a three point bending test.

FIG. 1 shows a view of four round steel wires 1 of 0.25 mm diameter and a tensile strength of 3150 Newton/mm$^2$, laid in parallel, side by side in the plane of the drawing and making a line contact with each other, so as to form a strip. A wrapping wire 2 of 0.15 mm is tightly wound around the strip with a pitch of about three times the breadth b of the strip. FIG. 2 shows a transverse cross-section of the same strip. The fact that the wrapping wire is tightly wound around the strip makes that this wire 2 must make a sharp bend around the edge 3 when passing from one side to the other side of the strip, and that, when making the bend, the wire 2 must keep in firm contact with the edge. This can be obtained by taking during manufacturing a specific precautionary measure, as schematically shown in FIG. 3, in order not to finish with a loose wrapping.

FIG. 3 shows schematically a wrapping machine in which four round wires 1 arrive in the sense of the arrow, side by side in a plane perpendicular to the drawing, so that only one wire is seen. The wrapping machine comprises a fixed frame 5 in which a rotatable axle 6 is mounted by means of bearings 7. This axle is driven into rotation by a gearing (only partly shown in 13). The axle 6 is axially traversed by a central bore. The four wires 1 traverse the axle 6 through the bore from left to right. At the right side, the axle 6 tapers into a point 8 and the four wires 1 emerge at this point. The wrapping machine further comprises a bobbin 9, mounted on the axle 6 for rotation together with said axle. This bobbin comprises the 0.15 mm wrapping wire 2, which is drawn over the flange 10 of the bobbin by means of flier arm 11. This arm 11 is rotatably mounted, by means of bearing 12, on a bush 15, which is removably fixed on the axle 6, and rotates together with said axle. The flier arm 11 can consequently rotate with respect to the bobbin 9, but this rotation is braked by means of brake 16 which is laterally pressed to the left against the flier 11, by means of a spring 18, of which the pressure is adjustable by means of the nut 17, which engages with a screwthread 19 on the bush 15. In this way an adjustable tension is created in the wrapping wire 2 on its way to the point where it joins the four parallel wires 1.

It is important that, at the point where the wrapping wire 2 joins the four wires 1, these four wires with the joining wrapping wire pass between two pressure rollers 20 and 21, so that the wrapping of the wire 2 occurs under the pressure of the rollers. When the rollers are positioned after the joining point, the wrapping is not sufficiently tight, even with a strong tension in the wrapping wire on its way towards the joining point. In order to avoid that the four parallel wires 1 would change position outside their plane, the point, where these wires emerge from the bore in the axle 6, is brought as near as possible (e.g. not more than 10 times the breadth of the strip) to the joining point of the wrapping wire between the rollers 20 and 21, and this is the reason why the rotating axle 6 tapers into a point.

The parallel wires 1 of the strip must not necessarily be bound together by a wrapping wire. They can be bound by embedding them in a chemical adhesive 22 (FIG. 4), but still in such a way that the wires make a frictional contact with each other. In order to increase the friction, the parts 23 where the wires make contact with each other can be flattened (FIG. 5). This can be done by slightly rolling the strip of wires 1 (FIG. 3) before entering the rotating axle 6.

The table hereunder compares, by way of example, the stiffness of four samples. Sample A is a rolled steel strip with rectangular cross-section of 0.25 mm by 1 mm and with a tensile strength of 2556 N/mm$^2$. Sample B is an open cord construction consisting of 4 round wires having a diameter of 0.25 mm. Two wires are twisted around the other two wires, the latter being untwisted and parallel to each other. This cord has a tensile strength of 2700 N/mm$^2$. Sample C is a theoretical example of 4 parallel round wires of 0.25 mm diameter in a same plane, making line contact with each other, and 100% fixed to each other along the line contacts. This sample is taken for having an idea of the maximum obtainable stiffness in the plane of the strip. Sample D is a sample according to the invention of 4 parallel round wires of 0.25 mm and a tensile strength of 3150 N/mm$^2$, with a wrapping wire of 0.15 mm diameter, tightly wound around the bundle, with a pitch of 3.52 mm, manufactured according to the method given hereinabove.

The stiffness, as known, is the resistance to bending, i.e. the elasticity modulus E multiplied by the momentum of inertia I of the cross-section around the neutral plane.

According as the stiffness is measured for a bending in the plane of the strip or in a longitudinal plane perpendicular to the plane of the strip, the stiffness is called the "lateral" or the "radial" stiffness. For samples A and C, the theoretical stiffness can be calculated, because for a rectangle, the momentum of inertia is bh$^3$/12 (b being the dimension of the rectangle in the direction of the neutral line and h the dimension perpendicular thereto), and for a circle this momentum is equal to $\pi d^2/64$. The modulus elasticity E of steel is assumed to be 200.000 N/mm$^2$. The results of the calculations are given in the table.

Figure 7:
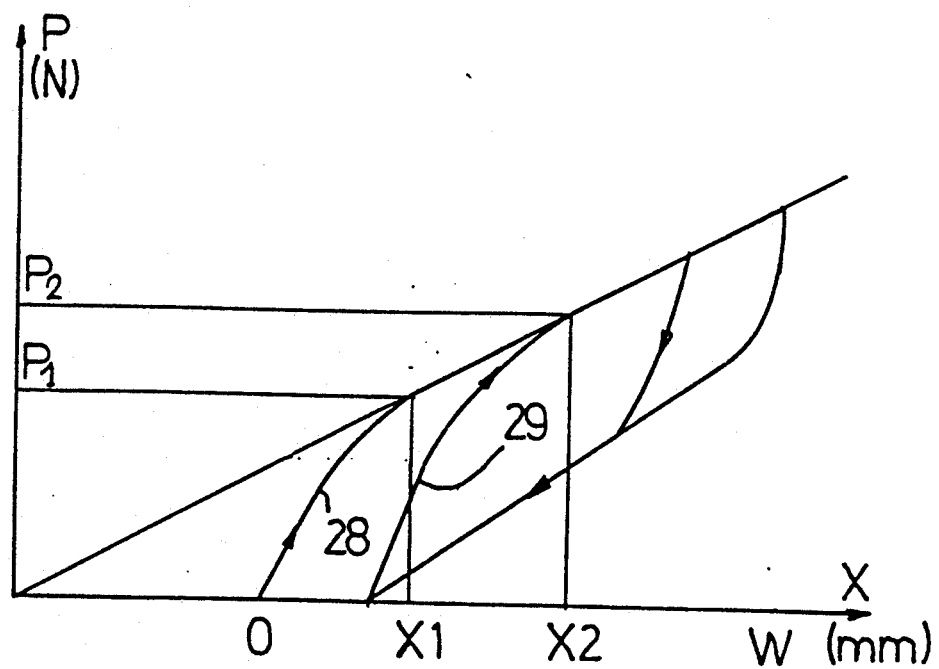
FIG. 7 shows a force versus displacement diagram obtained with a three point bending test.

For samples A, B and D, the stiffness can be measured with a three point bending test. A tensile testing machine in accordance with ASTM E4 and equipped with a compression cell is used. FIG. 6 illustrates the set-up of a three-point-bending-test. Two supports 24 at an interdistance l bear two rollers 25. The sample 26 is put on the rollers 25. A force by a stylus 27 causes a displacement x of the sample 26. A force versus displacement diagram is recorded during the test. An example of such a diagram is shown in FIG. 7. The force P forms the ordinate, the displacement x the abscissa. 28 represents the first loading and 29 the second loading. The total displacement is called W. Following points are determined on the diagram: X1 at a distance 0.3 W from 0, X2 at a distance 0.6 W from 0; P1 and P2, the ordinates corresponding to the abscissa X1 resp. X2. The stiffness is then calculated as follows:

$$\epsilon_y = \frac{(P2 - P1) \times l^3}{48\,(OX2 - OX1)} - (Nmm^2)$$

Further details about the three point bending test may be found in the paper by Bourgois L., "Survey of Mechanical Properties of Steel Cord and related test methods" in *Tire Reinforcement and Tire Performance*, ASTM STP 694, R. A. Fleming and D. F. Livingston, Eds. American Society for Testing and Materials, 1979, pp. 19–46.

However, the three point bending test as such is not suited to measure directly the lateral stiffness of an elongate sample, i.e. a sample with a different radial and lateral stiffness. This is so, because the elongate sample would overturn during the measurement.

In order to avoid this unstability, four elongate samples, in this case four samples D, are embedded in a small rubber beam with a rectangular cross-section having a length of about 6 mm and a height of about 2.6 mm. The planes of the four samples D must be parallel to the height of the cross-section of the rubber beam.

parallel for forming a belt ply for rubber tires, such belt ply can be significantly thinner.

TABLE

|  | Theoretical Stiffness (Nmm$^2$) | | | Measured Stiffness (Nmm$^2$) | | |
| --- | --- | --- | --- | --- | --- | --- |
|  | radial | lateral | lat/rad | radial | lateral | lat/rad |
| A. 1.0 × 0.25 rectangle | 260 | 4167 | 16 | 382 | 4513 | 11.81 |
| B. 2 + 2 × 0.25 open cord |  |  | 1 | 238 | 238<br>732 in rubber | 1 |
| C. 4 × 0.25 strip 100% tied | 153 | 3068 | 20 |  |  |  |
| D. 4 × 0.25 + 1 × 0.15/3.52 strip |  |  |  | 288 | 2001<br>↓ (*)<br>651 | 2.26 |

(*) conversion ratio = 732/238 = 3.1

The rubber beam is put on the rollers 25, the short axis (height) of its cross-section being vertical, the long axis (length) being horizontal. The three point bending test is then carried out on the rubber beam in the conventional manner. In this way a stiffness of 2001 Nmm$^2$ for each sample D. However, this value of the stiffness is overestimated because of the influence of rubber. When four samples B are also embedded in the same way in such a rubber beam, then a lateral stiffness of 732 Nmm$^2$ is obtained for the samples, while the real lateral stiffness of sample B is equal to the radial stiffness of sample B and is about 238 Nmm$^2$, thus an overestimation with a ratio of 732/238=3.1.

Division of the measured stiffness of sample D (2001) by 3.1 eliminates the influence of rubber and gives 651 N/mm$^2$ as a result for the lateral stiffness of sample D.

Figure 8:
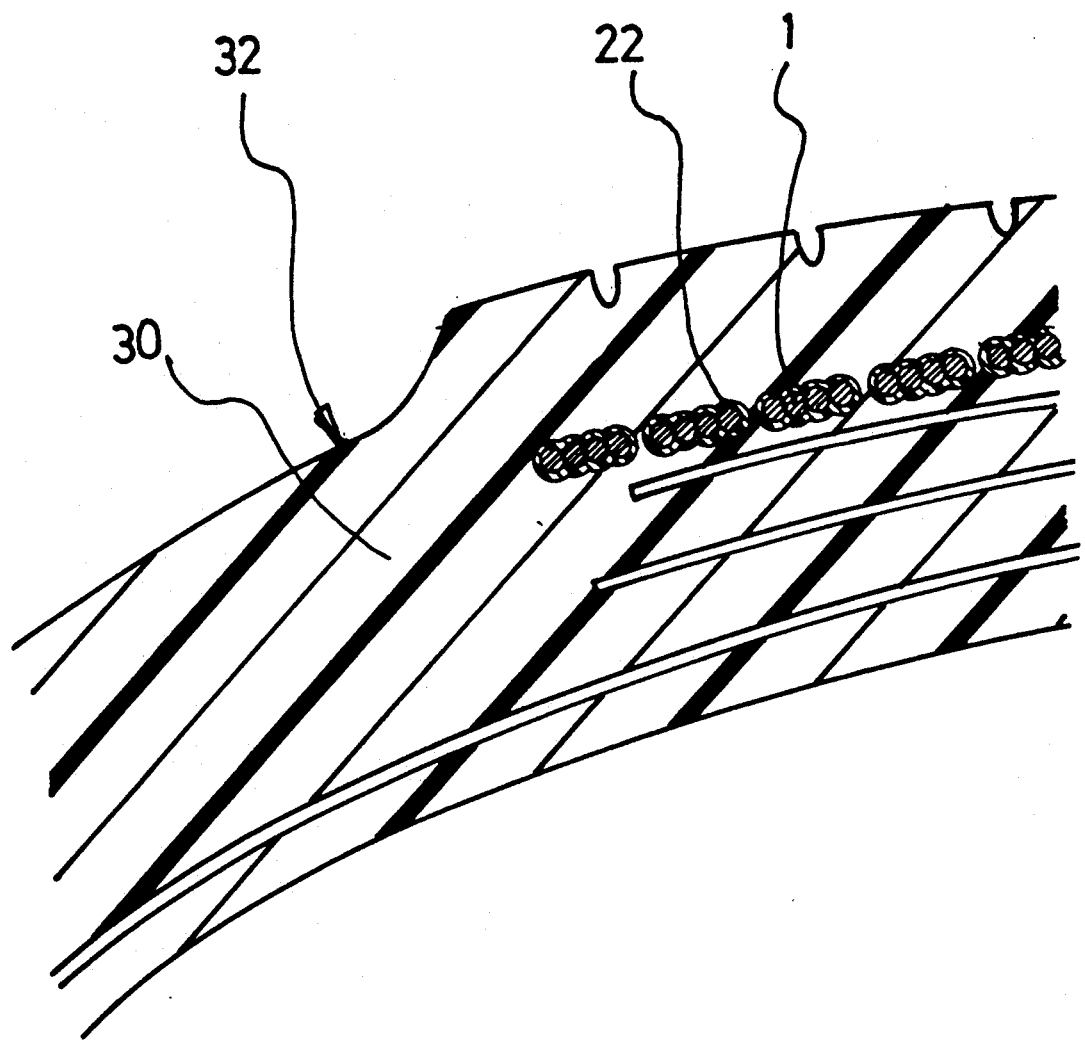
FIG. 8 shows a vehicle tire whose belt portion is reinforced with a plurality of strips according to the invention.

Referring to FIG. 8, a vehicle tire 32 includes a belt portion. The belt portion has a rubber portion 30 and a plurality of reinforcing strips according to the invention. Each of the strips includes steel filaments 1 which are bound to each other with an adhesive 22.

The invention is not limited to a bundle of completely straight steel wires. These wires can be undulated, either in the plane of the strip (adjacent wires still being in contact with each other along their length, which needs a same wavelength), or outside the plane of the strip. In the latter case it is interesting to have parallel straight wires, which make a short undulation upwards out of the general plane of the strip at the locations where the wrapping wire passes under the wire, and a short undulation downwards at the location where the wrapping wire passes over the longitudinally running wire. In such a way, when short cut ends of such strip are laid in

I claim:

1. A vehicle tire including a belt portion, said belt portion comprising:
   a rubber portion; and
   a plurality of reinforcing strips disposed in said rubber portion;
   wherein
   each of said strips includes steel and has a significantly higher bending stiffness in the plane of said strip than in the longitudinal plane perpendicular thereto;
   each of said strips has a steel cross-section between 0.05 mm$^2$ and 2 mm$^2$, a tensile strength above 2200 N/mm$^2$, and an elongation at break above 1.5%;
   each of said strips is in the form of a bundle of four to seven single steel wires, the bundle is free of any twists, said wires are positioned side by side in one plane, and each of said wires has a round cross-section,
   adjacent wires of said bundle are in contact with each other, and bound to each other in said belt portion with an adhesive other than the rubber of said rubber portion to such extent that said strip presents, in the plane of said strip, a significant excess of bending stiffness above the sum of bending stiffness of each of said wires in the plane of said strip, said adhesive having a shearing modulus which is greater than 2.5 MN/m$^2$ and which is greater than a shearing modulus of the rubber portion.

2. A vehicle tire according to claim 1, wherein said bundle of steel wires is in a straight position and is free of bends and curves.

* * * * *